Oct. 15, 1940.  W. R. GILLETTE  2,217,742
PITMAN
Filed Jan. 18, 1939
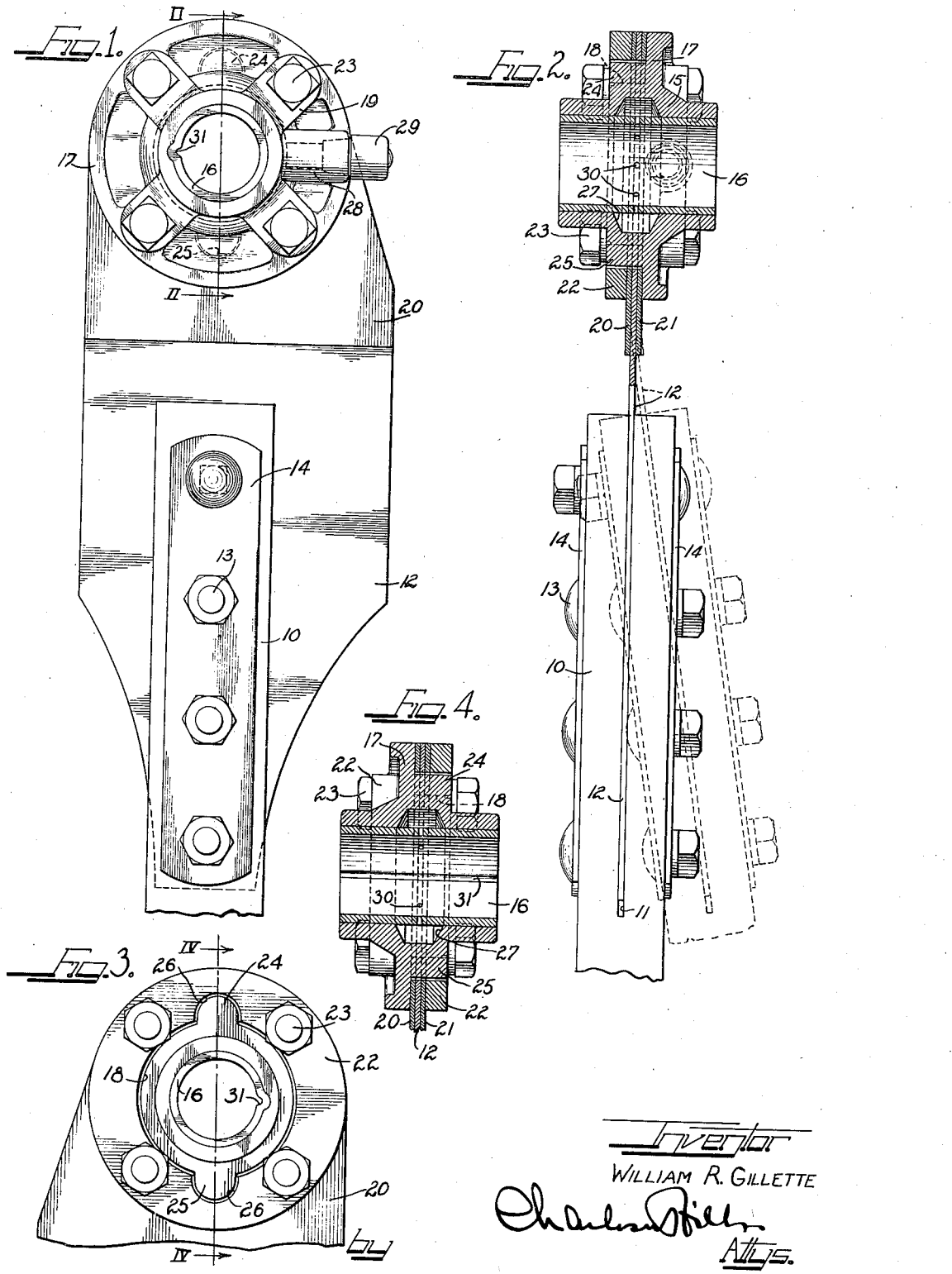
Inventor
WILLIAM R. GILLETTE

UNITED STATES PATENT OFFICE 2,217,742

PITMAN

William R. Gillette, Maywood, Ill., assignor to Illinois Iron & Bolt Company, Carpentersville, Ill., a corporation of Illinois Application January 18, 1939, Serial No. 251,455

3 Claims. (Cl. 74—579)

The present invention relates in general to pitmans and pitman connections such as utilized for mowers, combines, harvesters and other agricultural implements.

As is well known in the art, agricultural implements such as mowing machines, grain harvesters and the like, which utilize a pitman for driving a cutter bar, the pitman during operation is subjected to extremely rigorous and hard usage. The head or bearing box end of the pitman, which according to the usual practice is connected to a crank or wrist pin carried by a crank disk flywheel fixed to a driving shaft, has been a particular source of trouble. When the cutter bar is adjusted out of its normal position, thereby changing the plane of operation of the cutter bar relative to the crank pin, or, when the crank pin is tilted due to the tongue of the mower being raised or lowered, the pitman is subjected to abnormal stresses which cause undue wear on the parts and not infrequently these stresses cause failure and breakage of the parts.

It has therefore been previously proposed to provide a pitman connection having a single flat plate connecting the pitman bar and the bearing or driving member connected with the crank wheel of the machine having the requisite thickness and rigidity to transmit the longitudinal forces for reciprocating the pitman, but at the same time having sufficient flexibility to provide the necessary lateral movement to accommodate misalignment between the crank pin and the cutter bar. In such constructions, it has been found that the single flat plate, while in a measure eliminating some of the difficulties, ultimately failed adjacent its connection to the bearing member, due probably to its being rigidly anchored in such a way that an abrupt bending line resulted between the anchored portion of the plate and the adjacent flexible portion thereof.

In order to overcome such tendency of the plate to fail along this line, the present invention contemplates a pitman connection employing lateral flexible supplemental plates disposed on either side of the main plate in surface engagement therewith and projecting a short distance outwardly from the bearing member. These plates are normally inactive, but in the event that the main plate is flexed to one side, the supplemental plate on that side applies pressure against the plate in its area adjacent the rigidly secured portion thereof, thus acting to confine the plate flexure adjacent its anchored portion to a curve gradually leading into the plane of its anchored portion, rather than to an abrupt bending line as in previous arrangements. In other words, the main and supplemental plates act in the manner of a leaf spring in which the amount of flexing is decreased adjacent the point of support.

It is therefore an object of the present invention to provide in a pitman construction improved means for flexibly connecting a pitman bar and bearing box.

A further object of the invention is to provide an improved bearing box construction for a pitman wherein the bearing parts which are connected to the flexible plate are provided with novel means for interlocking the parts together in a circumferential direction for opposing shearing forces.

A still further object of the invention is to provide an efficient lubricating arrangement in the bearing box for a pitman.

Other objects and features of the invention will more fully appear from the following detailed description taken in connection with the accompanying drawing which illustrates a single embodiment thereof, and in which:

Figure 1 is a side view of the head end of a pitman connection embodying the principles of the present invention;

Figure 2 is a plan view of this end of the pitman showing the bearing box in section, when viewed along the line II—II in the direction of the arrows shown in Figure 1;

Figure 3 is an enlarged fragmentary view of the bearing box, looking at its left end as viewed in Figure 2; and Figure 4 is a fragmentary sectional view through the same, taken substantially on line IV—IV of Figure 3.

As shown on the drawing:

As illustrative of the invention, the pitman is disclosed as including a wooden pitman bar 10 having an end slot 11 for the reception of a flat, metallic, and preferably steel, extension 12. This extension is secured to the bar by a plurality of bolts 13 which extend through the end of the bar through suitable openings in the extension plate. The heads and nuts of these bolts may overlie suitable side plates 14—14 if desired.

This end of the plate 12 may be tapered as shown. The plate is of sufficient width to project above and below the bar 10 and of sufficient length to extend a short distance beyond the end of the bar 10. The free end of the flat extension member 12 is apertured to receive a novel form of bearing box which is journalled, as is usual in this art, on a crank pin carried by the crank disk mounted on the mower drive shaft.

This bearing box comprises a tubular housing 15 adapted to internally receive a bearing sleeve 16.

Intermediate its ends, the housing 15 is thickened to provide a circumferentially extending flange 17 which projects outwardly from a circumferentially extending outer surface portion 18.

The outermost side of this flange is provided at spaced intervals around the housing with integrally formed bolt abutment pads 19, as clearly shown in Figure 1. In the present instance four of these pads are provided so that the securing bolts will be diametrically disposed and spaced at 90° intervals.

The tubular housing is arranged to be introduced into the aperture at the free end of the extension, and arrangement is made for the placing of coextensive supplemental plates 20 and 21 on both sides of the end of extension 12. These supplemental plates are likewise apertured for receiving the tubular housing therethrough.

These supplemental plates are also constructed of light flexible, preferably steel, material, and together with the main plate 12 are clamped to the tubular housing by a clamping ring 22 which is clampingly associated with the flange 17 and secured in clamped position by clamping bolts 23 which extend through suitable apertures in the pads 19, the plates 12, 20 and 21 and the ring 22. The heads of these bolts preferably are placed in engagement with the pads 19 and the nuts of the bolts tightened against the clamping ring.

In order to interlock the tubular housing with the clamping ring and the plates, the circumferentially extending surface 18 is provided with outwardly extending ribs 24 and 25 adapted to extend into suitable grooves or notches 26 of the ring 22. The plates 12, 20 and 21 are similarly notched to receive the ribs. Thus the bearing box is interlocked in a circumferential direction with the plates and this interlocking opposes the setting up of shearing forces which might otherwise tend to shear the securing bolts 23 during the severe operating conditions imposed upon the pitman.

It will be noted that the plates 20 and 21 extend outwardly from the outer periphery of the clamping ring 22 and flange 17 over the adjacent portion of the plate 12.

By virtue of this arrangement, the plates 12, 20 and 21 in effect form a leaf spring construction adjacent the bearing box. It will be noted that the plates 20 and 21 normally are inactive in so far as plate 12 is concerned during normal operation. In the event, however, that misalignment should occur between the pitman bar 10 and the bearing box, the main plate 12 will be deflected as shown in dotted lines in Figure 2. If the plates 20 and 21 were not present, the main plate would tend to be abruptly bent over the peripheral surface of the flange or the ring 22. Continual bending of this nature would cause a failure of the main plate at this point. However, by inserting the supplemental plates 20 and 21, the bending of the main plate adjacent the bearing box is resiliently opposed so that the plate in this area is flexed in a smooth curve rather than abruptly, this curve of flexure gradually leading into the plane of the plates where they are clampingly anchored between the flange 17 and ring 22. It will be evident that such an arrangement will prevent breaking of the main plate adjacent its anchored end.

The interior of the tubular housing is provided intermediate its ends with a circumferentially extending lubricating chamber 27 which is closed on its inner side by the bearing sleeve 16. This chamber communicates with the exterior of the housing through a tubular boss 28 which may be fitted with a suitable lubricating connection 29 to enable the introduction of lubricant into the chamber 27 under pressure.

The sleeve 16 is centrally provided with circumferentially spaced openings 30 which equally distribute the lubricant around the sleeve in a circumferential direction and at a position intermediate its ends. The interior of the sleeve 16 is also provided with a longitudinal groove 31 which acts to distribute the lubricant lengthwise of the bearing. It will be noted that with this construction, there are no joints in the housing through which lubricant might flow from the chamber 27 to the exterior thereof.

From the foregoing description, it will be apparent that the present invention provides an improved pitman construction in which the pitman bar is connected to the bearing box in a flexible manner in such a way that breakage of the connection is prevented due to a flexing thereof resulting from misalignment of the bar with the bearing box; which embodies an improved bearing box construction in which the parts are interlocked in a circumferential direction, thus opposing shearing forces which might shear the bolts for securing the parts together; and which includes an efficient and effective lubricating arrangement for equally distributing lubricant circumferentially around the bearing sleeve.

It is, of course, to be understood that although I have described in detail a preferred embodiment of my invention, the invention is not to be thus limited, but only in so far as defined by the scope and spirit of the appended claims.

I claim as my invention:

1. A pitman for mowers or the like comprising a bar having a longitudinally extending slot at one end, a flat flexible end tapered plate having one of its tapered ends connected to said bar within said slot, coextensive flexible reinforcing plates laterally disposed at the other tapered end of said first flexible plate, said flexible plates being respectively provided with aligned notched apertures, a bearing housing formed to provide a substantially tubular portion and a peripherally extending flange, said tubular portion being arranged to extend through and complementally engage said notched apertures with said flange seating against one of said reinforcing plates, a clamping ring cooperating with said flange to clamp said flexible plates therebetween, and means securing said ring and flange together for interlocking the housing and flexible plates in a direction circumferentially of said housing.

2. A pitman for mowers or the like comprising a bar having a longitudinally extending slot at one end, a flat flexible end tapered plate having one of its tapered ends connected to said bar within said slot, a pair of shorter flexible reinforcing plates respectively disposed on each side of said tapered plate in face engagement with its other tapered end, the laminae of plates having aligned notched apertures therethrough, a bearing housing having a peripheral flange and a tubular portion extending axially therefrom, said tubular portion being provided with ribs extending along the length thereof, said ribbed tubular portion being disposed in said notched apertures with said flange seated against one of the reinforcing plates for interlocking the housing and laminae of plates in a circumferential direction, a clamping ring having interior notches adapted to complementally engage said ribbed tubular portion and to cooperate with said flange for clamping the flexible plates therebetween, and securing means extending through said ring, laminae of plates and flange for securing them together, said ribs and notches cooperating to relieve said securing means of shearing stresses.

3. A pitman for mowers or the like comprising a bar having a longitudinaly extending slot at one end, a flat flexible end tapered plate having one of its tapered ends connected to said bar within said slot, a pair of shorter flexible reinforcing plates in spaced engagement with and on each side of said tapered plate at its other tapered end, the laminae of plates having aligned notched apertures therethrough, a bearing housing including a pair of clamping parts for securing said plates together, one of said parts having a peripheral flange and a tubular portion extending axially therefrom, said tubular portion being provided with ribs extending along its length and disposed in said notched apertures with the flange seated against one of the reinforcing plates, said one part also defining an interior circumferentially extending lubrication chamber having an exterior connection, a bearing sleeve in said one part having circumferentially spaced openings communicating with said chamber, the other of said parts having a central aperture provided with interior notches arranged to complementally engage the ribbed tubular portion of said one part, said clamping parts cooperating to clamp the flexible plates therebetween, and securing means extending through said laminae of plates and clamping parts for clamping them together, said ribs and notches cooperating to relieve the securing means of shearing stresses.

WILLIAM R. GILLETTE.